Feb. 24, 1948.　　　G. W. DAUGHERTY　　　2,436,556
HITCH
Filed Sept. 26, 1945　　　2 Sheets-Sheet 1

INVENTOR
G. W. Daugherty
BY
A. H. Golden
ATTORNEY

Feb. 24, 1948.  G. W. DAUGHERTY  2,436,556
HITCH
Filed Sept. 26, 1945  2 Sheets-Sheet 2
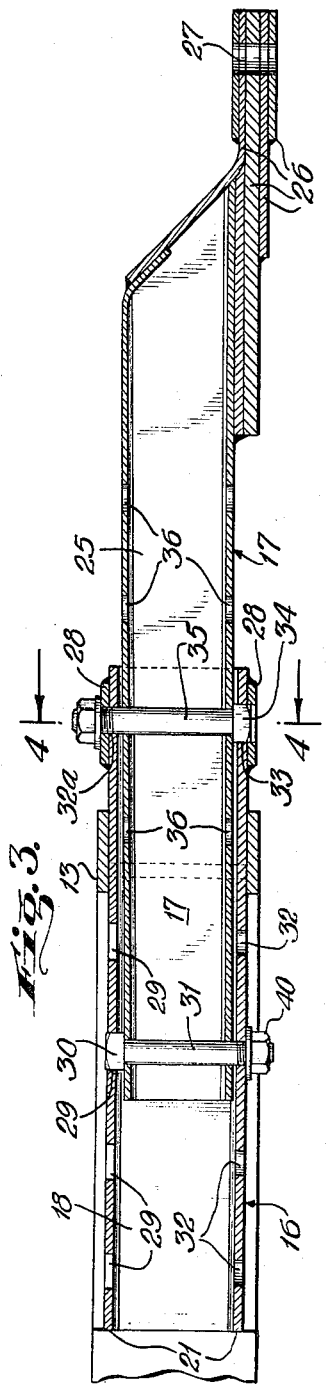
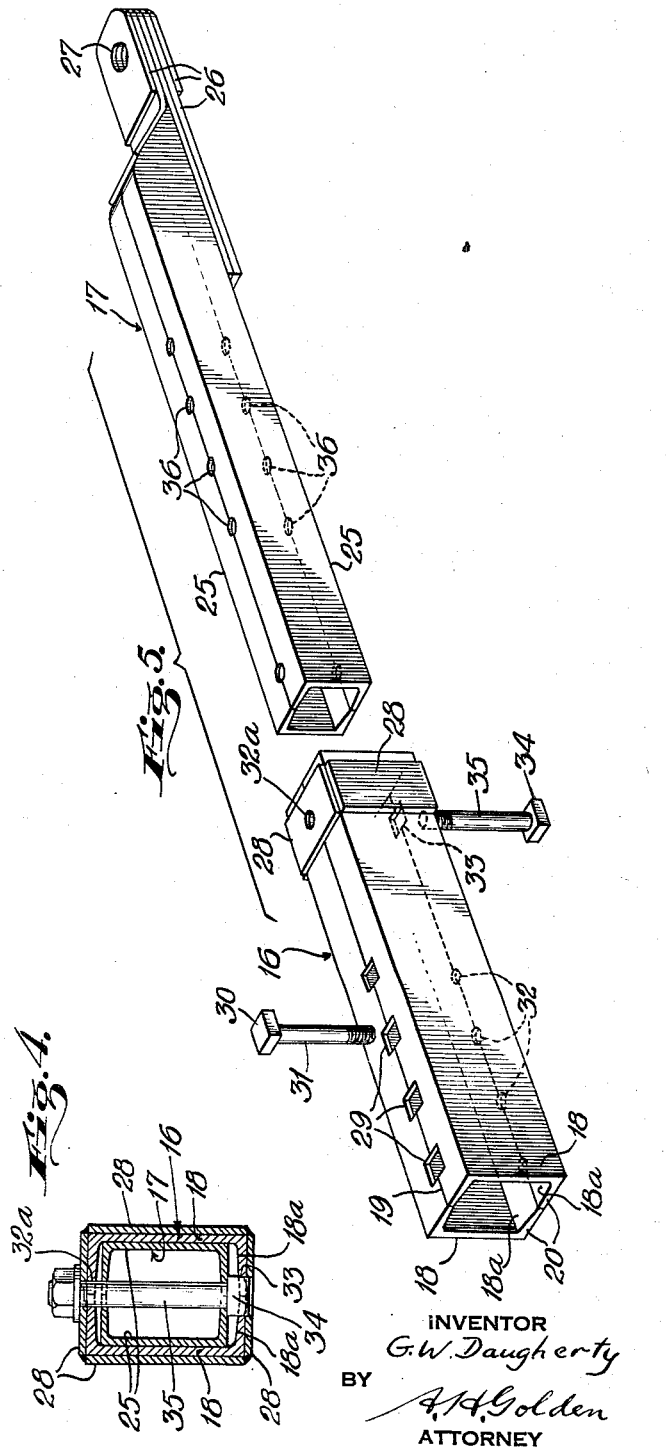
INVENTOR
G. W. Daugherty
BY
A. H. Golden
ATTORNEY Patented Feb. 24, 1948

2,436,556

UNITED STATES PATENT OFFICE 2,436,556

HITCH

George W. Daugherty, Orlando, Fla.

Application September 26, 1945, Serial No. 618,618

16 Claims. (Cl. 280—33.44)

This invention relates to a traction hitch, and more particularly, to a traction hitch of the heavy duty type particularly adapted for hauling a heavy spraying machine such as illustrated in my Patent No. 2,331,107. Even more particularly, my invention relates to a traction hitch of the type that is readily adjustable. While I shall describe my hitch applied to my spraying machine, it is actually adapted for use with any type of vehicle, as those skilled in the art will appreciate.

It is the object of my invention to contribute a traction hitch that is extremely rugged and which will act to form a non-vibrating, rigid connection between a traction vehicle and the apparatus pulled thereby.

As a feature of my invention I utilize what I term a tubular traction hitch member relatively to which is secured in adjustable relation what I term a tractive hitch member, the securing of the two members to one another resulting in a rigid non-vibrating hitch. Actually, the tubular traction hitch member may be considered to be an element having integral spaced arms which are held in spaced relation by the remaining metal of the tubular hitch member. Through the use of the spaced arms between which is secured the tractive hitch member, I obtain great strength, and through the novel features of my invention, I am able to contribute the rigidity and freedom of vibration that is so necessary.

Because of the nature of my invention, the advantageous features thereof will be more apparent after a study of the description and specification thereof that follows, and I therefore shall not, at this point, emphasize further the particular novel features of the invention.

Figure 1:
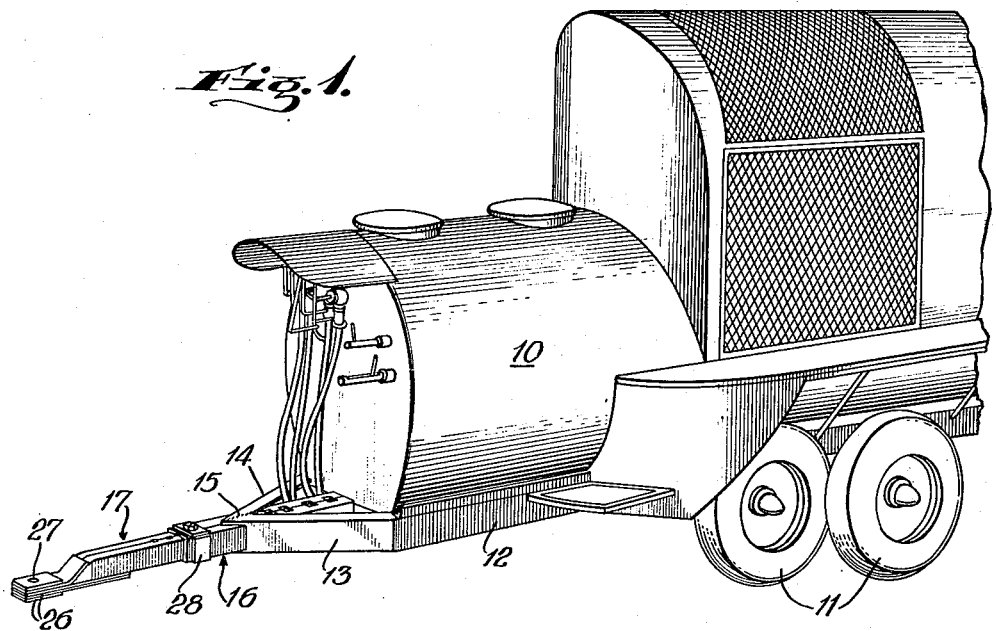
Figure 2:
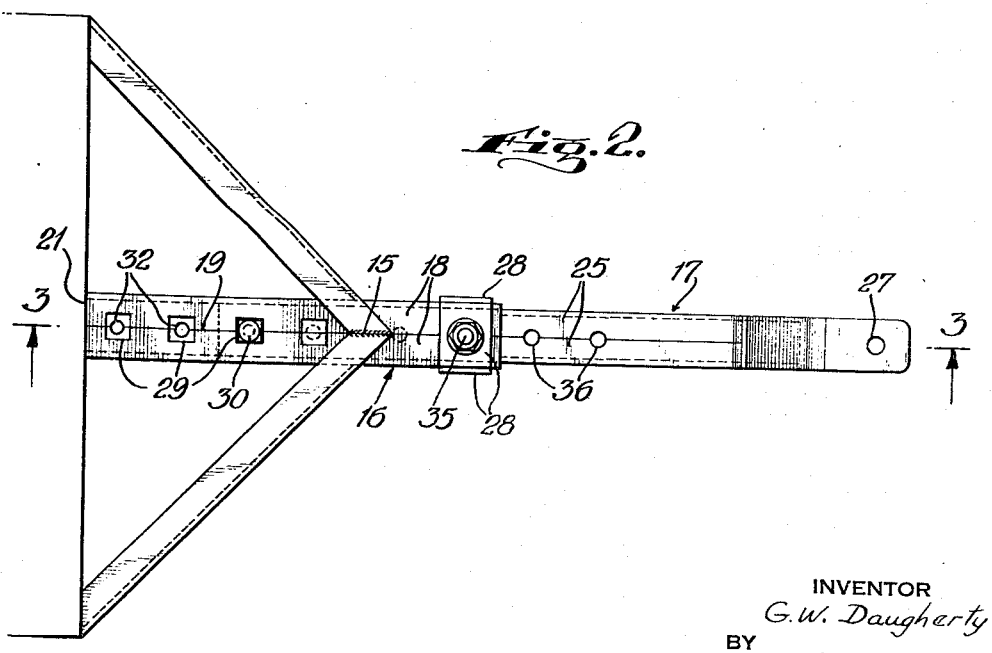

Referring now to the drawings, Fig. 1 is a perspective view of a spraying machine of my patent showing the traction hitch applied thereto. Fig. 2 is a view looking downwardly on the traction hitch per se. Fig. 3 is a section taken along line 3—3 of Fig. 2. Fig. 4 is a section taken along line 4—4 of Fig. 3. Fig. 5 is an exploded view of the hitch.

Referring now more particularly to the drawings, reference numeral 10 indicates a spraying machine supported on wheels 11 and adapted to be pulled by a suitable tractor. The spraying machine 10 has a main frame 12 to which are secured metal structural channels 13 and 14 preferably by welding, the upper flanges of channels 13 and 14 meeting at 15 and being welded there as is probably best seen in Fig. 2.

The hitch per se is preferably formed of two nesting tubular members best illustrated in Fig. 5, one bearing reference numeral 16 and the other reference numeral 17. The member 16 may be termed the traction hitch member, and is formed of channels 18 that are welded together along the lines 19. The ends 20 of channel members 18 may be welded to the frame 12 of the machine as at 21, as best seen in Figs. 2 and 3. The channels 13 and 14 may then be welded to the traction hitch member 16 in re-enforcing relation thereto, the channels 13 and 14 being suitably cut away for the passage of the tubular member 16 as is probably best apparent in Figs. 1, 2, and 3. The manner of securing and re-enforcing the hitch relatively to frame 12 is not an important part of the invention but is here set forth to indicate a preferred way of utilizing the invention.

The tubular hitch member 17 is preferably termed by me a tractive hitch member, and is formed of a pair of channels 25 that are welded in much the same manner as the channels forming the traction hitch member 16. A series of re-enforcing plates 26 are welded to the hitch 17 and are pierced or drilled at 27 for the passage of a coupling bolt, all as those skilled in the art will fully appreciate.

I have found it advisable to re-enforce the traction hitch member 16 by a series of re-enforcing plates 28 applied to the extreme right end of the member 16 as best illustrated in Figs. 4 and 5.

The upper surface of the traction hitch member 16 is formed with a series of square openings 29, each sufficiently large for the vertical passage of the head 30 of a bolt 31. Each opening 29 will, however, hold bolt 31 against rotation. A series of bores 32 are formed in the lower surface of the traction hitch member 16 for the passage of the stem of the bolt 31. At the extreme right end of the hitch member 16 there is formed one square opening 33 in the lower surface thereof for the passage of the head 34 of a bolt 35, the upper surface of the hitch coupling member having a small bore 32a for the stem of the bolt 35. Of course, opening 33 will hold bolt 35 against rotation.

The tractive hitch member 17 is formed with a series of aligned upper and lower bores 36, with none of the bores being sufficiently large for the passage of the heads of the bolts 31 or 35. When it is desired to couple the two hitch members 16 and 17, the tractive hitch member 17 is telescoped into the traction hitch member 16 as best illustrated in Figs. 3 and 4. The distance that the tractive hitch member 17 is inserted will depend on the length of the coupling desired. With the tractive hitch member 17 telescoped within the traction hitch member 16, a bolt 31 is dropped downwardly until its head 30 is within one of the square openings 29 as best seen in Fig. 3. The bolt will then rest with its head 30 against the member 17. When a nut 40 is applied to the threads of the bolt 31, the bolt cannot turn because its head is held against rotation. It will then be possible to apply downward pressure from the head 30 of the bolt against the tractive member 17 so as to draw the tractive member toward the lower surface of the traction hitch member 16. Because the traction hitch member 16 is formed of channels having tapered surfaces 18a as best seen in Figs. 4 and 5 the tractive hitch member 17 will contact the lower surface of the traction hitch member 16 only at the corners thereof.

A second bolt 35 will be moved upwardly with its head 34 within the square opening 33 of the traction hitch member 16. The head 34 will draw the tractive hitch member 17 upwardly toward the upper surface of the traction hitch member 16, or in a direction directly opposite that in which the tractive hitch member 17 is drawn by the bolt 31. Therefore, the member 17 will assume a somewhat cocked position within the tubular traction hitch member 16. This cocked or angular relation of the two parts of the traction hitch will tend to form a rigid, non-vibrating coupling that I have found to be extremely effective. Naturally, the degree of cocking will depend on the looseness of the fit of member 17 in traction member 16.

Moreover, through the use of the combination of elements illustrated, I am able to utilize the known strength of tubular members while eliminating any possibility of play between the members. So far as I know, it has never heretofore been possible to place one tubular member within another tubular member to form a traction hitch and to maintain the tubular members against looseness. I am able to obtain the results indicated without the addition of costly or complicated means of any sort, the results being inherent in the construction of the parts of my hitch.

It may be well to emphasize at this point that the upper and lower surfaces of the traction hitch member 16 may be considered to be upper and lower arms, while the upper and lower surfaces of the tractive hitch member 17 may also be considered upper and lower arms. The arms of the tractive hitch member 17 will, of course, assume a cocked binding position relatively to the upper and lower arms of the traction member 16 even if the intermediate channel portions between the arms of the traction member 16 are not utilized.

I believe that the nature of my invention will now be apparent to those skilled in this art. Naturally, I believe that I have contributed a relatively broad invention and I do not wish, therefore, to be limited to the particular structure herein set forth, but rather expect to receive patent claims that will prevent the appropriation of my invention by those who may seek to utilize my invention by mechanical means other than those herein set forth. Thus, as I have already indicated, my tubular traction hitch member may be considered to be merely spaced integral arms with the tractive member secured to one arm at one point and to the other arm at another point. Similarly, while I prefer and consider more desirable a square tubular traction hitch member, other tubular forms may be used.

I now claim:

1. In a hitch of the class described, a traction member having a pair of linearly extending arms formed as part thereof and maintained in spaced relation, a linearly extending tractive member positioned between said arms, means securing one part of said tractive member against one of said arms, and means securing another part of said tractive member against the other of said arms at a point linearly spaced from said first means.

2. In a hitch of the class described, a traction member having a pair of linearly extending arms formed as an integral part thereof and maintained in spaced relation, a linearly extending tractive member positioned between said arms, a bolt drawing one part of said tractive member against one of said arms, and a bolt drawing another part of said tractive member against the other of said arms at a point linearly spaced from said first bolt.

3. In a hitch of the class described, a traction member having a pair of linearly extending arms formed as part thereof and maintained in spaced relation, a linearly extending tractive member positioned between said arms, said arms and member having aligned openings at linearly spaced points for the passage of bolts, each of said arms having at least one opening enlarged for the passage of a bolt head against said member, whereby a bolt head and bolt draws one part of said tractive member against one of said arms and a second bolt head and bolt draws another part of said tractive member to the other of said arms at a point linearly spaced from said first bolt.

4. In a hitch of the class described, a traction member having a pair of linearly extending arms formed as part thereof and maintained in spaced relation, a linearly extending tractive member positioned between said arms, said arms and member having aligned openings at linearly spaced points for the passage of bolts, one of said arms having an opening enlarged for the passage of a bolt head against said member, whereby a bolt head and bolt draw said tractive member against the other of said arms.

5. In a hitch of the class described, a traction member having a pair of linearly extending arms formed as part thereof and maintained in spaced relation, a linearly extending tractive member positioned between said arms, said arms and member having aligned openings at linearly spaced points for the passage of bolts, each of said arms having at least one opening enlarged for the passage of a bolt head against said member, a bolt inserted through one series of aligned openings with its head passing through an enlarged opening of one arm against said tractive member whereby said bolt draws the tractive member against the opposed arm, a second bolt inserted through another series of aligned openings with its head passing through an enlarged opening in said opposed arm against said tractive member, whereby said second bolt draws the tractive member against the first arm.

6. In a hitch of the class described, a tubular traction member, a tractive member extending into said tubular traction member, means securing one part of said tractive member against a particular surface of said tubular traction member, and means securing a part of said tractive member linearly spaced from said first part against a surface of said tubular traction member opposed to said first surface whereby to tend to cock said tractive member within said tubular traction member.

7. In a hitch of the class described, a tubular traction member, a tractive member extending into said tubular traction member, a bolt drawing one part of said tractive member toward a particular surface of said tubular traction member, and a second bolt drawing a part of said tractive member linearly spaced from said first part toward a surface of said tubular traction member opposed to said first surface of said tubular traction member whereby to tend to cock said tractive member within said tubular traction member.

8. In a hitch of the class described, a tubular traction member, a tractive member extending into said tubular traction member, said tubular traction member and said tractive member having aligned openings at linearly spaced positions for the passage of headed bolts, at least one opening in each of opposed walls of said tubular traction member being enlarged for the passage of a bolt head against the tractive member, a bolt passing through one series of aligned openings and with its head passing through an enlarged opening of a wall of said tubular traction member against said tractive member for drawing the tractive member against the opposed wall of said tubular traction member, and a second bolt passing through a second series of openings with its head passing through an enlarged opening of said opposed wall of said traction member against said tractive member whereby said bolt draws the tractive member against the first wall of said tubular traction member.

9. In a hitch of the class described, a square tubular traction member having external surfaces adapted to be held horizontally and vertically, a square tractive member adapted for insertion into said tubular member, said tubular member and said tractive member having vertically aligned openings at linearly spaced positions for the passage of headed bolts therethrough, at least one opening of the upper and lower walls of said tubular traction member being enlarged for the passage of the head of a bolt against the tractive traction member, a bolt inserted downwardly into one series of openings with its head impinging against said tractive member to draw it downwardly against said square tubular traction member, and a bolt inserted upwardly through another series of openings with its head impinging against said tractive member to draw it upwardly against said square tubular traction member.

10. In a hitch of the class described, a tubular traction member, a tractive member extending into said tubular traction member, said tubular traction member and said tractive member having aligned vertical openings at linearly spaced positions for the passage of headed bolts, at least one opening of the upper and lower series of openings of the tubular traction member being enlarged for the passage of a bolt head against the tractive member, a bolt passing downwardly through one series of aligned openings and with its head passing through an enlarged opening of the upper wall of said tubular traction member against said tractive member for drawing the tractive member downwardly against the lower wall of said tubular traction member, and a second bolt passing upwardly through a second series of openings with its head passing through an enlarged opening of the lower wall of said tubular traction member against said tractive member whereby said bolt draws the tractive member upwardly against the upper wall of said tubular traction member.

11. In a hitch of the class described, a tubular traction member, a tractive member extending into said tubular traction member, said tubular traction member and said tractive member having aligned vertical openings at linearly spaced positions for the passage of headed bolts, one opening in the wall of said tubular traction member being enlarged for the passage of a bolt head against the tractive member, and a bolt head in said enlarged opening with its stem passing through the openings aligned with said enlarged opening for drawing said tractive member against said tubular traction member.

12. In a hitch of the class described, a traction member having a pair of linearly extending arms formed as part thereof and maintained in spaced relation, a linearly extending tractive member positioned between said arms, said arms and member having aligned openings at linearly spaced points for the passage of bolts, each of said arms having at least one opening enlarged for the passage of a bolt head against said tractive member, whereby a bolt head and bolt draws one part of said tractive member against one of said arms and a second bolt head and bolt draws another part of said tractive member to the other of said arms at a point linearly spaced from said first bolt, said enlarged openings being formed to prevent rotation of said bolt heads.

13. In a hitch of the class described, a tubular traction member, a tractive member extending into said tubular traction member, said tubular traction member and said tractive member having aligned openings at linearly spaced positions for the passage of headed bolts, at least one opening in each of opposed walls of said tubular traction member being enlarged for the passage of a bolt head against the tractive member, said enlarged openings being formed to prevent rotation of said bolt heads, a bolt passing through one series of aligned openings and with its head passing through an enlarged opening of a wall of said tubular traction member against said tractive member for drawing the tractive member against opposed wall of said tubular traction member, and a second bolt passing through a second series of openings with its head passing through an enlarged opening of said opposed wall of said tubular traction member against said tractive member whereby said bolt draws the tractive member against the first wall of said tubular traction member.

14. In a hitch of the class described, a tubular traction member, a tractive member extending into said tubular traction member, said tubular traction member and said tractive member having aligned vertical openings at linearly spaced positions for the passage of headed bolts, at least one opening of the upper and lower series of openings of the tubular traction member being enlarged for the passage of a bolt head against the tractive member, said enlarged openings being formed to prevent rotation of said bolt heads, a bolt passing downwardly through one series of aligned openings and with its head passing through an enlarged opening of the upper wall of said tubular traction member against said tractive member for drawing the tractive member downwardly against the lower wall of said tubular traction member, and a second bolt passing upwardly through a second series of openings with its head passing through an enlarged opening of the lower wall of said tubular traction member against said tractive member whereby said bolt draws the tractive member upwardly against the upper wall of said tubular traction member.

15. In a hitch of the class described, a tubular traction member, a tractive member extending into said tubular traction member, means securing one part of said tractive member against a particular surface of said tubular traction member, and means securing a part of said tractive member linearly spaced from said first part against a surface of said tubular traction member angularly spaced relatively to said first surface whereby to tend to cock said tractive member within said tubular traction member.

16. In a hitch of the class described, a tubular traction member, a tractive member extending into said tubular traction member, a bolt drawing one part of said tractive member toward a particular surface of said tubular traction member, and a second bolt drawing a part of said tractive member linearly spaced from said first part toward a surface of said tubular traction member angularly spaced relatively to said first surface of said tubular traction member whereby to tend to cock said tractive member within said tubular traction member.

GEORGE W. DAUGHERTY.

REFERENCES CITED

The following references are of record in the file of this patent:

UNITED STATES PATENTS

| Number | Name | Date |
| --- | --- | --- |
| 2,106,923 | Tuft | Feb. 1, 1938 |
| 2,135,227 | Voorhees | Nov. 1, 1938 |